US010266201B2

(12) United States Patent
Dang et al.

(10) Patent No.: US 10,266,201 B2
(45) Date of Patent: Apr. 23, 2019

(54) K-TURN PATH CONTROLLER

(71) Applicant: AGJUNCTION LLC, Hiawatha, KS (US)

(72) Inventors: Tri M. Dang, Durack (AU); Timothy J. Sullivan, Kedron (AU)

(73) Assignee: AGJUNCTION LLC, Hiawatha, KS (US)

( * ) Notice: Subject to any disclaimer, the term of this patent is extended or adjusted under 35 U.S.C. 154(b) by 62 days.

(21) Appl. No.: 15/348,072

(22) Filed: Nov. 10, 2016

(65) Prior Publication Data

US 2017/0144702 A1 May 25, 2017

Related U.S. Application Data

(60) Provisional application No. 62/257,398, filed on Nov. 19, 2015.

(51) Int. Cl.
| | |
|---|---|
| *B62D 15/02* | (2006.01) |
| *B62D 6/00* | (2006.01) |
| *A01B 69/04* | (2006.01) |
| *G01S 19/13* | (2010.01) |

(52) U.S. Cl.
CPC .......... *B62D 6/002* (2013.01); *A01B 69/008* (2013.01); *B62D 6/001* (2013.01); *B62D 15/02* (2013.01); *G01S 19/13* (2013.01)

(58) Field of Classification Search
CPC . B62D 15/02; B60T 2260/02; B60T 2230/08; B60W 2540/18; B60W 10/20; B60W 30/10; B60W 30/12; G05D 2201/0201; G01S 19/13

USPC .......... 701/41, 42, 43, 26, 48, 50, 58
See application file for complete search history.

(56) References Cited

U.S. PATENT DOCUMENTS

| | | | |
|---|---|---|---|
| 3,605,904 A | | 9/1971 | Rutterford |
| 5,194,851 A | | 3/1993 | Kraning et al. |
| 5,390,125 A | | 2/1995 | Sennott et al. |
| 5,663,879 A | | 9/1997 | Trovato et al. |
| 5,870,303 A | * | 2/1999 | Trovato ............. B62D 15/0285 700/255 |

(Continued)

OTHER PUBLICATIONS

Bergerman, Marcel, "Results with Autonomous Vehicles Operating in Specialty Crops" 2012 IEEE International Conference on Robotics and Automation, River Centre, Saint Paul, Minnesota, USA May 14-18, 2012 at 1829 (Year: 2012).*

(Continued)

*Primary Examiner* — Richard A Goldman
(74) *Attorney, Agent, or Firm* — Schwabe Williamson & Wyatt

(57) ABSTRACT

A guidance system may derive a K-turn path when a vehicle reaches an end of a first way line in a field. The guidance system may send the K-turn path to a steering controller to turn the vehicle around in a headland area to the beginning of a second way-line in the field. A first segment of the K-turn path may turn the vehicle along a first path in a forward direction and a second segment of the K-turn path may turn the vehicle along a second path in a reverse direction. A third segment of the K-turn path may turn the vehicle along a third path in the forward direction to a starting location of the second way-line. The K-turn path uses less area than other types of turns reducing the amount of headland used for turning around the vehicle.

19 Claims, 9 Drawing Sheets

(56) References Cited

U.S. PATENT DOCUMENTS

| | | |
|---|---|---|
| 5,923,270 A | 7/1999 | Sampo et al. |
| 6,052,647 A | 4/2000 | Parkinson et al. |
| 6,070,673 A | 6/2000 | Wendte |
| 6,212,453 B1 | 4/2001 | Kawagoe et al. |
| 6,377,889 B1 | 4/2002 | Soest |
| 6,445,983 B1 | 9/2002 | Dickson et al. |
| 6,539,303 B2 | 3/2003 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,277,792 B2 | 10/2007 | Overschie |
| 7,437,230 B2 | 10/2008 | McClure |
| 7,460,942 B2 | 12/2008 | Mailer |
| 8,190,337 B2 | 5/2012 | McClure |
| 8,589,013 B2 | 11/2013 | Pieper et al. |
| 8,649,930 B2 | 2/2014 | Reeve et al. |
| 8,954,216 B2 | 2/2015 | Yazaki |
| 2002/0072850 A1 | 6/2002 | McClure et al. |
| 2004/0186644 A1 | 9/2004 | McClure et al. |
| 2006/0167600 A1 | 7/2006 | Nelson, Jr. et al. |
| 2009/0118904 A1* | 5/2009 | Birnie ................... G01C 21/00 701/41 |
| 2010/0211271 A1* | 8/2010 | Yasutake ............... B60T 8/1755 701/48 |
| 2010/0274452 A1 | 10/2010 | Ringwald et al. |
| 2012/0330525 A1* | 12/2012 | Kornhaas ............. B60T 8/1766 701/70 |
| 2015/0100177 A1* | 4/2015 | Inagaki ................ B60W 30/06 701/1 |
| 2015/0336587 A1* | 11/2015 | Inoue .................. B60W 50/087 701/41 |
| 2016/0046286 A1* | 2/2016 | Jeong ................. B60W 30/045 701/37 |
| 2016/0159348 A1* | 6/2016 | Lavoie .................. B62D 13/06 701/41 |
| 2017/0144702 A1* | 5/2017 | Dang ..................... B62D 6/002 |
| 2017/0168501 A1* | 6/2017 | Ogura .................. G05D 1/0278 |

OTHER PUBLICATIONS

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidante of Agricultural Impleet ns in the Open Field by Means of Real Tim Kinematic DGPS, ASA-CSSA-SSSA pp. 1023-1034 (1999).

* cited by examiner

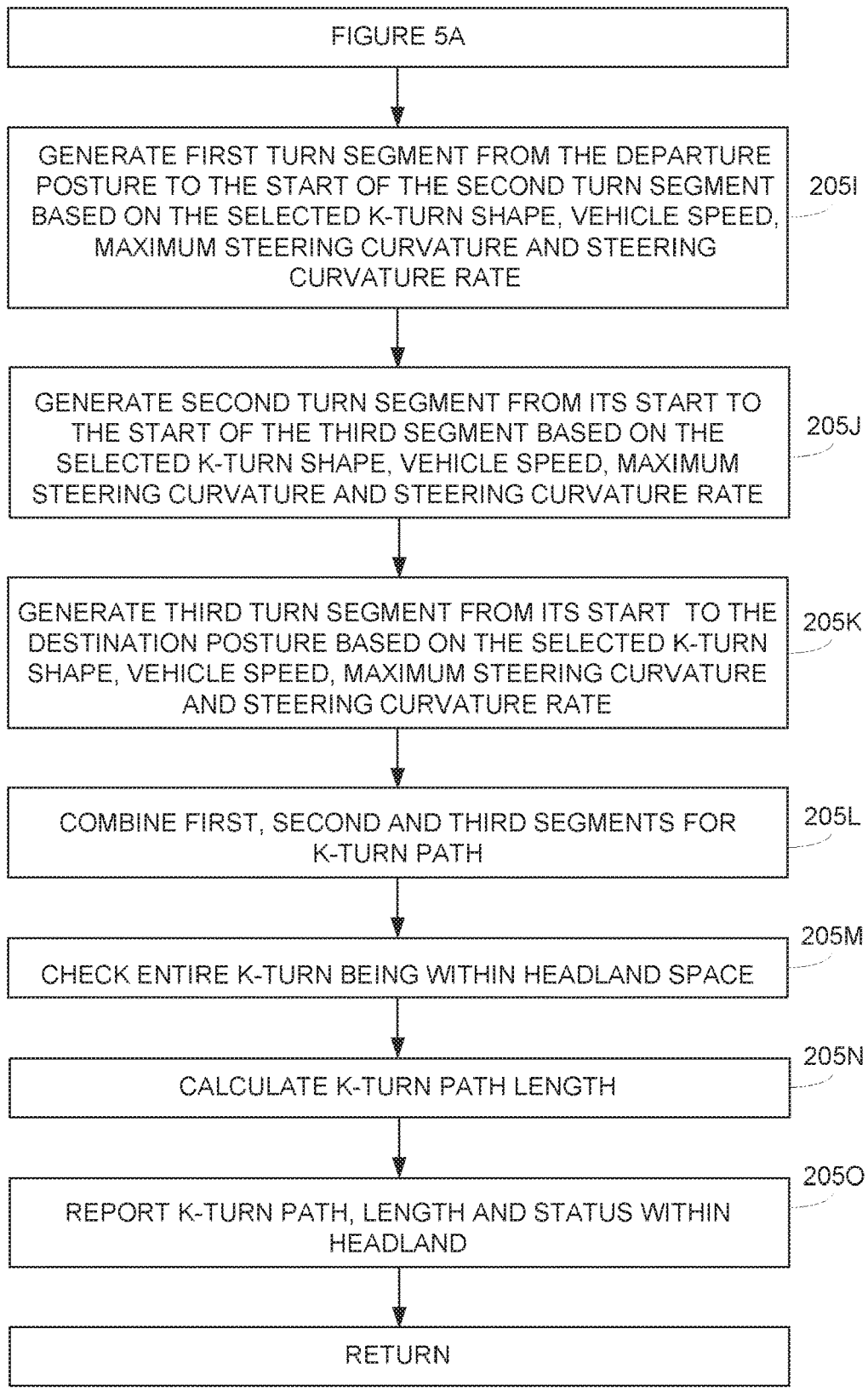

K-TURN PATH CONTROLLER

The present application claims priority to U.S. Provisional Patent Application Ser. No. 62/257,398 filed on Nov. 19, 2015, entitled: K-TURN PATH PLANNING which is incorporated by reference in its entirety.

TECHNICAL FIELD

One or more implementations relate generally to performing K-turns.

BACKGROUND

Guidance systems autonomously guide farm vehicles along predefined paths or rows in a field. At the end of each row the controller or a vehicle operator may turn the vehicle around 180 degrees and direct the vehicle along a next adjacent row. The turn-around area is referred to as a headland area of the field. A significant amount of headland is used for turning around vehicles reducing the amount of field area available for growing crops.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 5A and 5B show the process for generating the K-turn in more detail.

DETAILED DESCRIPTION

Figure 1:
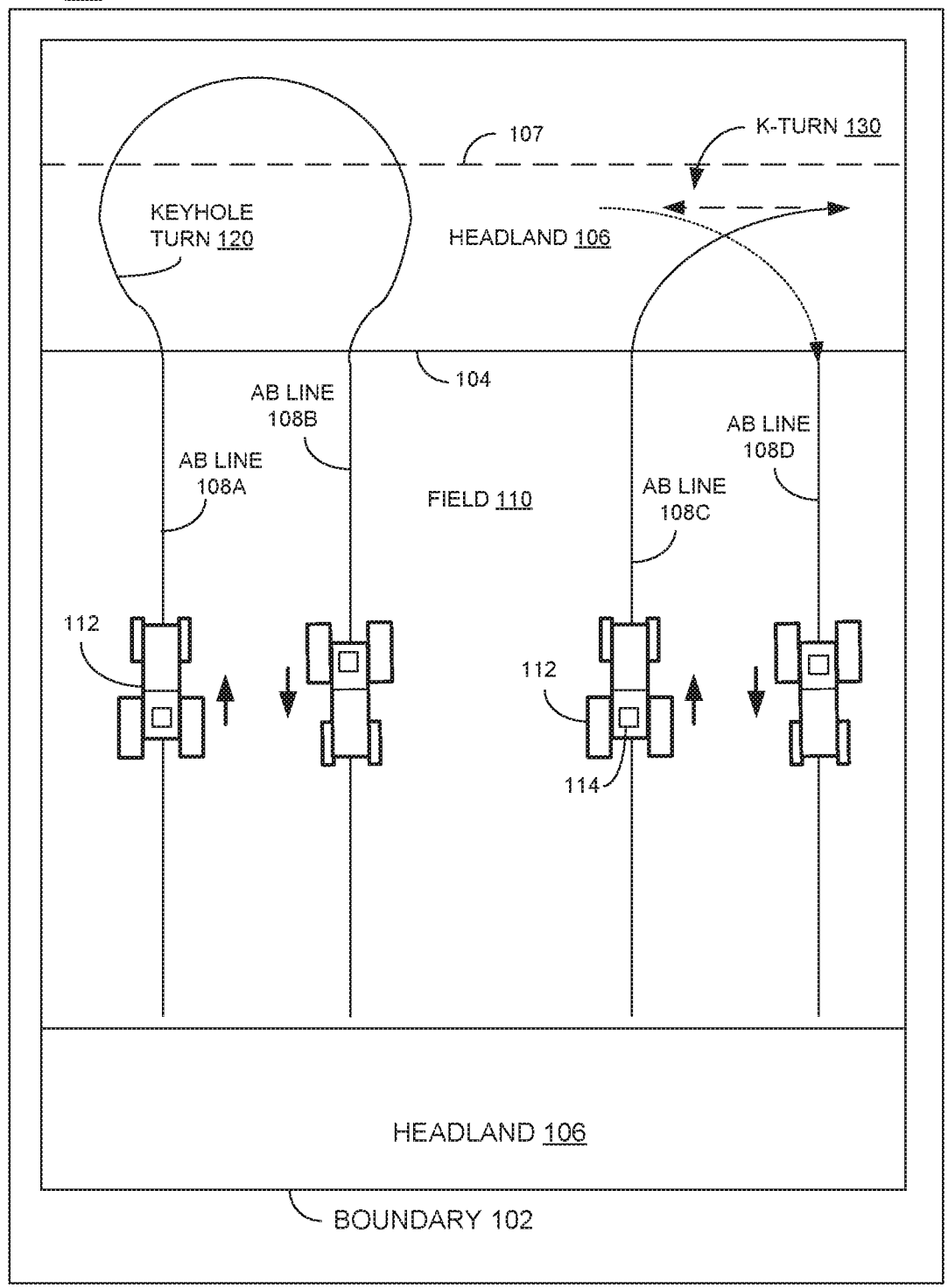
FIG. 1 shows example keyhole turns and K-turns.

FIG. 1 depicts an example diagram of an electronic map 100 of a field 110. Electronic map 100 may be stored in a guidance system 114 and displayed on a computer screen to a vehicle operator. The vehicle operator may draw a boundary line 102 on electronic map 100 around field 110 and draw a border line 107 defining a headland area 106. The operator also may draw AB lines 108 on electronic map 100 that provide imaginary reference lines over rows in field 110.

In one example, guidance system 114 may include a global navigation satellite system (GNSS) and/or an inertial navigation system (INS) for detecting a position of vehicle 112 on field 110. Guidance system 114 may automatically steer vehicle 112 over AB line 108A. Previous guidance systems may go into an idle mode when vehicle 112 reaches an end of AB line 108A. The vehicle operator then may manually perform a keyhole turn 120 turning vehicle 112 around 180 degrees and back onto a next adjacent AB line 108B. The vehicle operator then re-activates the guidance system to automatically steer vehicle 112 over a next adjacent AB line 108B.

Guidance system 114 may automatically perform K-turns 130 that turn vehicle 112 around 180 degrees within headland 106 for traversing a next adjacent AB line 108B. K-turns 130 not only prevent the vehicle operator from having to manually turn around vehicle 112 but also reduce the amount of boundary or headland area used in field 110.

For example, guidance system 114 may automatically steer vehicle 112 along AB line 108C. Guidance system 114 may detect vehicle 112 reaching the end of AB line 108C near border 104. Guidance system 112 then may steer vehicle 112 through a series of turns referred to as K-turn 130. As shown in FIG. 1, K-turn 130 uses substantially less headland area 106 to maneuver vehicle 111 around 180 degrees and back onto next adjacent AB line 108D. The smaller headland area 106 frees up more area of field 110 for growing crops. The smaller turning area of K-turn 130 also reduces the likelihood of vehicle 112 colliding with trees and other obstructions that may extend around boundary 102 of field 110.

Table 1.0 details size comparisons between classical forward keyhole turn 120 and K-Turn 130 maneuvers generated under the same conditions at 15 kilometers (km)/hour (h). Table 1.0 shows K-turn 130 uses less width and height at almost each swath distance thus reducing the amount of headland area used for vehicle turns.

The width and height of the K-Turn paths in Table 1.0 may change at different swath distances when the vehicle is steered at different maximum curvatures and curvature rates at the departure and destination positions. At the departure position the K-Turn path planning may use a higher value of maximum curvature (or smaller turn radius) and steering curvature rate (faster steering) for a quicker and shorter turn. At the destination, the K-Turn may have a lower steering curvature and steering rate for a better line acquisition and alignment before the vehicle and implement get back into the field.

TABLE 1.0

Comparison between forward keyhole turn and K-turn maneuver.

| Swath (m) | Forward turn size (W × H) (m) | K-Turn size (W × H) (m) |
| --- | --- | --- |
| 0 | 34.15 × 47.28 | 34.42 × 30.57 |
| 5 | 34.15 × 46.72 | 29.91 × 29.77 |
| 10 | 34.15 × 45.80 | 26.84 × 29.65 |
| 15 | 34.32 × 44.52 | 27.55 × 29.18 |
| 20 | 35.59 × 42.77 | 28.45 × 28.30 |
| 25 | 36.46 × 40.26 | 29.58 × 26.82 |

Figure 2:
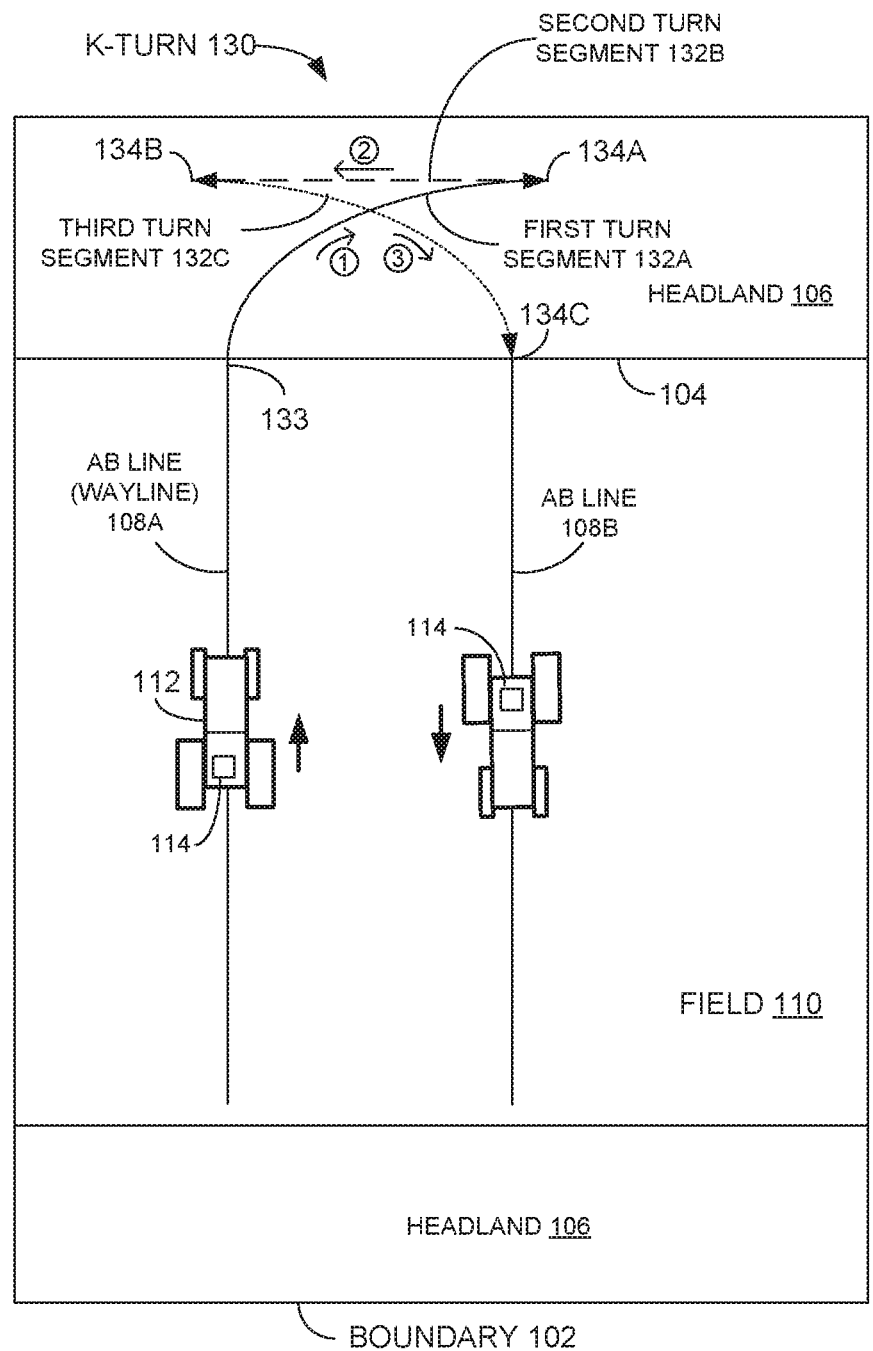
FIG. 2 shows the segments of a K-turn in more detail.

FIG. 2 shows in more detail one example of K-turn 130 performed by guidance system 114. In this example, guidance system 114 uses three different maneuvers. As vehicle 112 reaches the end of AB line 108A at border 104, guidance system 114 initiates a first K-turn segment 132A turning vehicle 112 to the right at a first steering curvature, steering curvature rate, speed, and distance to a first position 134A.

In one example, guidance system 114 may try to steer vehicle 112 from position 133 to position 134A as quickly as possible. For example, guidance system 114 may steer vehicle 112 at a maximum steering curvature and steering curvature rate. The maximum steering curvature is the hardest the vehicle can be turned to the left or right and the steering curvature rate is the rate is which the vehicle is turned to the left or right.

Guidance system 114 then changes vehicle 112 into a reverse gear and moves vehicle 112 in a reverse direction along a second straight (in this example) K-turn segment 132B. Guidance system 114 stops vehicle 112 after reaching a second position 134B. Guidance system 114 then changes vehicle 112 back into a forward gear and maneuvers vehicle 112 in a forward right turn direction along a third K-turn segment 132C with a second curvature. In one example, the curvature, curvature rate and length of segments 132A and 132C are symmetric. However, to further reduce the height or width of K-turn 130, the curvature, curvature rate and length of one of turn segments 132A or 132C may be different to the other.

After reaching a location 134C at the beginning of AB line 108B, guidance system 114 may transition back into a field processing mode and steer vehicle 112 along AB line 108B. Guidance system 114 may perform a similar K-turn 130 when vehicle 112 reaches an opposite end of field 110.

Segments 132 of K-turn 130 may be straight lines or continuous-curvature planar curves bounded by the maximum steering curvature of vehicle 112 and a curvature first derivative bounded by a maximum steering curvature rate of vehicle 112. Guidance system 114 may use a higher value of curvature and curvature rate for first two turn segments 132A and 132B and a lower value for third turn segment 132C to more quickly place an implement towed by vehicle 112 back on AB line 108B.

An example algorithm for generating continuous-curvature planar curves is described in: Thierry Fraichard, Alexis Scheuer. From Reeds and Shepp's to continuous-curvature paths. IEEE Transactions on Robotics, IEEE, 2004, 20 (6), pp. 1025-1035, which is herein incorporated by reference in its entirety.

The vehicle operator may manually initiate K-turn 130, or guidance system 114 may automatically initiate K-turn 130, when vehicle 112 reaches border 104. For example, vehicle 112 may be traveling at 2 meters/second and guidance system 114 may include a timer set at 50 seconds. If not fully automated, guidance system 114 may display an option to the vehicle operator to enable the automatic K-turn 130 when vehicle 112 comes within 100 meters of headland 106. Guidance system 114 may keep offering the K-turn on a computer screen until the K-turn can no longer be performed within headland area 106.

If the user enables the K-turn, guidance system 114 may complete first turn segment 132A and allow the vehicle operator to shift the vehicle into a reverse gear. Guidance system 114 then may automatically move vehicle 112 along second turn segment 132B, etc. Alternatively, the entire process, or any portion, of initiating K-turn 130 at the end of AB line 130A, executing turn segments 132A-132C, and steering vehicle 112 back over next AB line 108B may be automatically performed by guidance system 114.

Figure 3:
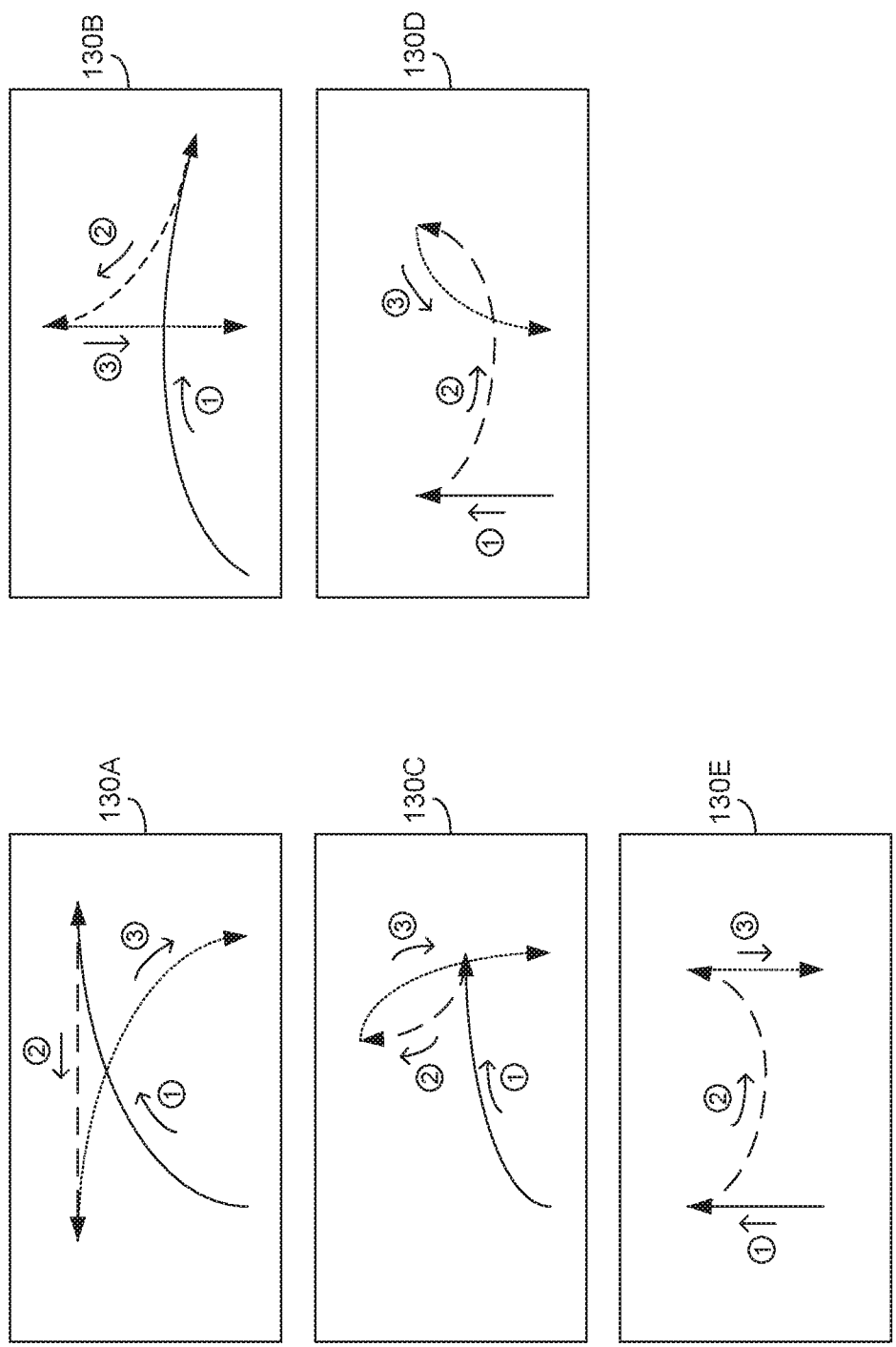
FIG. 3 shows different K-turn shapes.

Referring to FIG. 3, guidance system 112 may use different combinations of K-turn segments for K-turn 130. For a parallel field with straight parallel AB way-lines 108 guidance system 114 may use any of the following segment combinations to derive K-turn 130:

curve—straight—curve (K-turn 130A);
curve—curve—straight (K-turn 130B);
curve—curve—curve (K-turn 130C);
straight—curve—curve (K-turn 130D); or
straight—curve—straight (K-turn 130E).

For a contoured field, guidance system 114 may use K-Turns including:

curve—straight—curve (K-turn 130A); or
curve—curve—curve (K-turn 130C).

There may only be two or fewer turn options for contoured fields because the path curvature at the departing and destination positions are generally non-zero, which means the vehicle may not start and end the K-Turn with straight segments.

Guidance system 114 may automatically select different K-turns 130A-130E based on different environmental conditions including the orientation of vehicle 112 and the contour of field 110, number of skipped rows/way-lines 108, limits on the size of headland area 106, and other conditions specific to field applications.

For example, AB lines 108 may end on a left sloping hill promoting a first left curve segment, a second reverse curve segment, and a third left curve segment. In another example, based on the maximum steering curvature and vehicle maximum steering curvature rate, guidance system 114 may select one of K-turns 130A-130E using the least amount of overall headland area 106, smallest width, and/or smallest height.

In another example, guidance system 114 may select one of K-turns 130A-130E that uses a least amount of space left of a current AB line 108A or the least amount of space right of the current AB line 108A. K-Turn path 130E with first and last straight segments may be better for a parallel field with a trailed implement because it allows for full field coverage without extending outside of the headland area.

In another example, one of K-turns 130A-130E may be easier or more efficient to perform on a contoured headland 106 or a headland with a particular soil condition. For example, straight reverse second segments may be easier to execute on flat headland areas 106. In yet another example, a tree or other obstruction overhanging or lying within headland 106 may favor one of K-turns 130A-130E that avoids the obstruction.

K-turn 130A as depicted in FIG. 2 is an example of a curve—straight—curve segment combination. First curve segment 132A and last curve segment 132C of K-turn 130A are generally made up of three basic geometries:

1. A clothoid arc of curvature rate $\sigma = \pm \sigma_{max}$ and curvature changes from 0 to $\pm k_{max}$.
2. A circular arc of curvature $\pm k_{max}$.
3. A clothoid arc of curvature rate $-\sigma$ and curvature changes from $\pm k_{max}$ to 0.

The k and k values are the steering curvature and the maximum steering curvature, respectively of the vehicle. Steering curvature is the reciprocal of the turning radius of the vehicle to one direction. The unit of steering curvature is 1/m. The value of $k_{max}$ in general can be different when steering to the left and to the right.

The values $\sigma$ and $\sigma_{max}$ are the steering curvature rate and the maximum steering curvature rate, respectively, of the vehicle and indicate how fast the vehicle can be turned to the left or right. The unit of steering curvature rate is $1/m^2$. The sign convention for steering curvature and steering curvature rate is usually accepted to be positive to the right and negative to the left.

A clothoid is a curve whose curvature changes linearly with a constant rate with its curve length. The path that a vehicle usually takes steering from straight to full lock on one direction is an example of a clothoid. K-Turn path planning uses clothoid arcs from maximum steering curvature and curvature rate of a vehicle to generate curve segments that are both smooth and fully drivable for the vehicle to steer.

The circular arc in item 2 in many cases might have a zero length and the turn segment then may be two clothoids joined together. Guidance system 114 may use $k_{max}$ and $\sigma_{max}$ of vehicle 112 to achieve the shortest possible path length for K-turn 130.

Figure 4:
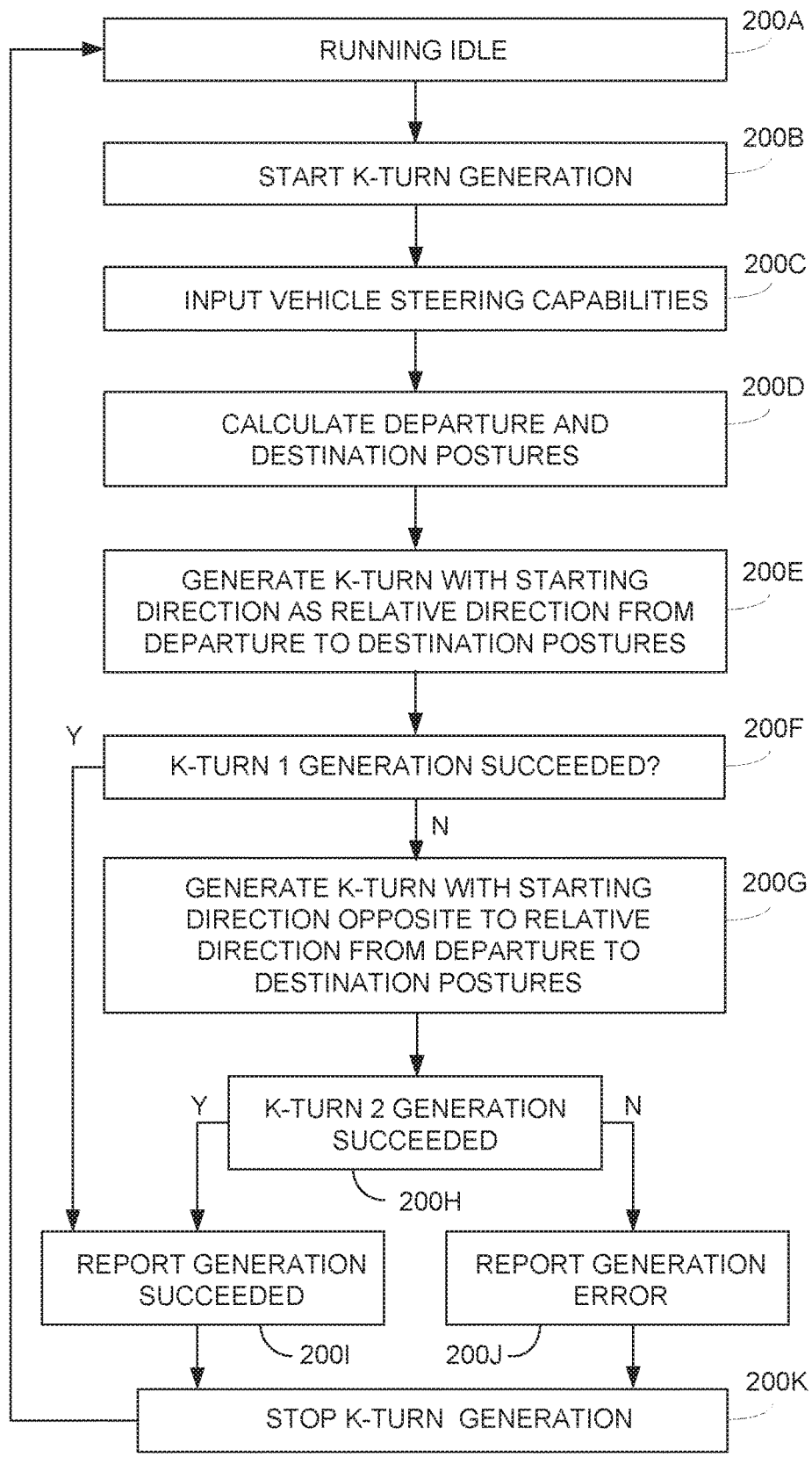
FIG. 4 shows an example process for calculating a K-turn.

FIG. 4 shows one example of how the guidance system derives a K-turn path for automatically turning around a vehicle. In operation 200A, the K-turn path generation runs in idle state waiting for a start command.

In operation 200B, the guidance system starts generating the next K-turn values for turning around the vehicle and continuing on a next adjacent AB line. In another example, guidance system 114 may pre-calculate the K-turns based on terrain information, map AB line directions, and headland dimensions identified in the electronic map shown in FIGS. 1 and 2. As mentioned above, the vehicle operator may initiate K-turn generation by selecting an icon on a guidance system display screen that directs the guidance system to calculate the next K-turn or series of K-turns. Alternatively, the guidance system may automatically start K-turn generation 200B based on vehicle 112 reaching border 104 of field 110 (FIG. 2).

In operation 200C, the guidance system reads vehicle steering capabilities from memory. The guidance system 114 may calculate and store the following vehicle steering parameters or may store the following pre-derived steering parameters:

vehicle maximum steering curvature to the left;
vehicle maximum steering curvature to the right; and
vehicle maximum steering curvature rate.

For example, during a configuration operation the operator or the guidance system may turn the steering wheel of the vehicle as far as possible to the left and then as far as possible to the right at a highest possible steering speed. The guidance system may measure the maximum left and right steering curvature (or minimum turning radii). The guidance system then may calculate the maximum steering curvature rate of the vehicle by measuring how fast the steering curvature changes. The guidance system may use the GPS receivers and inertial navigation devices to measure the vehicle maximum left and right steering curvature and curvature rate.

In operation 200D, the guidance system calculates the departure and destination postures of the vehicle. For example, the guidance system determines the position and heading of the vehicle at the end of the current AB line (departure posture) and desired position and heading of the vehicle at the beginning of the next AB line (destination posture). The guidance system may determine the departure posture from the GNSS and/or inertial navigation system (INS) data.

The guidance system may determine the destination posture based on the location and direction of the next target AB way-line. For example, the guidance system may calculate the destination posture at the starting point of the next AB way-line and the destination heading as 180 degrees from the current vehicle heading. This depends on the shape at each AB way-line of the field.

In operation 200E, the guidance system may generate the K-turn with a starting direction as a relative direction from the departure posture to the destination posture. For example, if the next AB way-line in the field is to the right of the current AB way-line, the guidance system may calculate the K-turn with a starting right turn.

The guidance system may report success in operation 200I if a K-turn path generated in operation 200E satisfies certain success criterion in operation 200F. The success criteria may include the K-turn joining the departing and destination postures, the entire K-turn with all three segments remaining within the headland, and the K-turn having a smallest overall length.

If K-turn generation is not successful, the guidance system in operation 200G retries the K-turn generation with the starting direction opposite to the relative direction from departure to destination postures. For example, for a long skipping distance between departure and destination swaths when turning to the right hand side direction, the guidance system may generate a curve-straight-curve K-turn combination with left turns for the first and third segments. An initial curve segment to the right, a second straight reverse segment, and a third curve segment to the right are shown in FIG. 2. However, to reduce the distance of the K-turn to the right, the guidance system may start with a first curve segment to the left, a second straight segment in a reverse direction to right, and the third curve segment to the left to the next AB way-line.

The guidance system reports success in operation 200I if the second K-turn generation meets the success criterion. If not, the guidance system reports a K-turn generation error and notifies the vehicle operator in operation 200J. In operation 200K, the guidance system completes K-turn generation and returns to running in idle state in operation 200A. If no K-turn can be successfully generated within the headland area, the operator may have to manually perform a manoeuver.

Figure 5A:
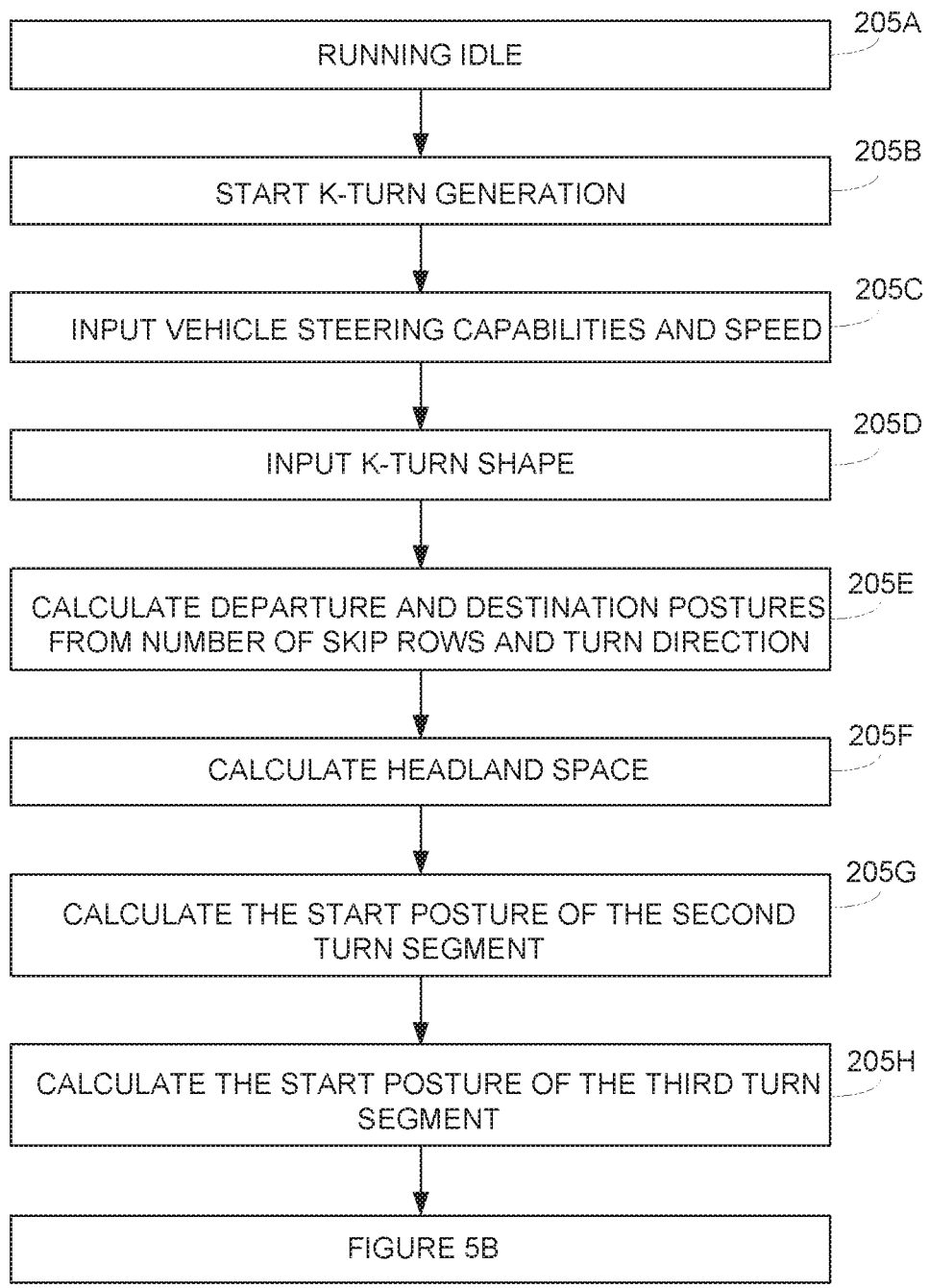

FIGS. 5A and 5B show in more detail how a K-turn is generated. In operation 205A, the guidance system again runs K-Turn generation in idle state and waiting for a start command. In operation 205B, the guidance system starts calculating K-turns for turning around the vehicle and continuing on a next adjacent AB line. Operation 205C reads the vehicle steering and speed capabilities as mentioned above in FIG. 4.

In operation 205D, the guidance system may select a K-turn shape for generation. For example, the guidance system may automatically select a first one of K-turn shapes 130 in FIG. 3. In one example, the guidance system may first select K-turn shape 130E for a flat field with substantially straight parallel rows or may first select K-turn 130C or 130D for a contoured field with curved rows. As also mentioned above, the vehicle operator may manually select or program which K-turn shapes to use for calculation and in what order.

For the selected K-turn shape, operation 205E determines the departure and destination postures based on the number of skipped rows and turn direction. The departure and destination postures may vary based on the shape of the AB way-lines, the spacing between the current and next AB way-line, and the selected first turn direction of the K-turn.

Operation 205F calculates the available headland space for the next K-turn. For example, different amounts of headland space may be available forward, to the left, and to the right based on the location of the current AB way-line and the next AB way-line. Operation 205G calculates the posture of the vehicle for the start of the second turn segment and operation 205H calculates the posture of the vehicle for the start of the third turn segment. For example, based on the selected K-turn, the start of the second and third segments may be in one of the different headings and locations shown in FIG. 3.

Operation 205I may calculate the first K-turn segment from the departure posture at the end of the current AB way-line to the start of the second turn segment. The path shape and length are based on the selected K-turn, vehicle speed, maximum steering curvature, and steering curvature rate. Operation 205J calculates the second K-turn segment from the start of the second turn segment to the start of the third K-turn segment. Operation 205K calculates the third K-turn segment from the start of the third turn segment to the start of the next AB way-line.

Operation 205L combines the three calculated segments together for the selected K-turn shape and operation 205M determines if any part of the K-turn path extends outside of the available headland space.

Operation 205N calculates the overall K-turn path length and/or the height and width of the K-turn shape. Operation 205O then stores the calculated K-turn length and status for possible comparison with other K-turn shapes. For example, the navigation system may produce a report used in FIG. 4 to determine which K-turn shape has the shortest overall length and remain within the available headland area. As explained above, the navigation system may select the K-turn shape with the shortest overall length that can be performed most quickly within the available headland area.

Figure 6:
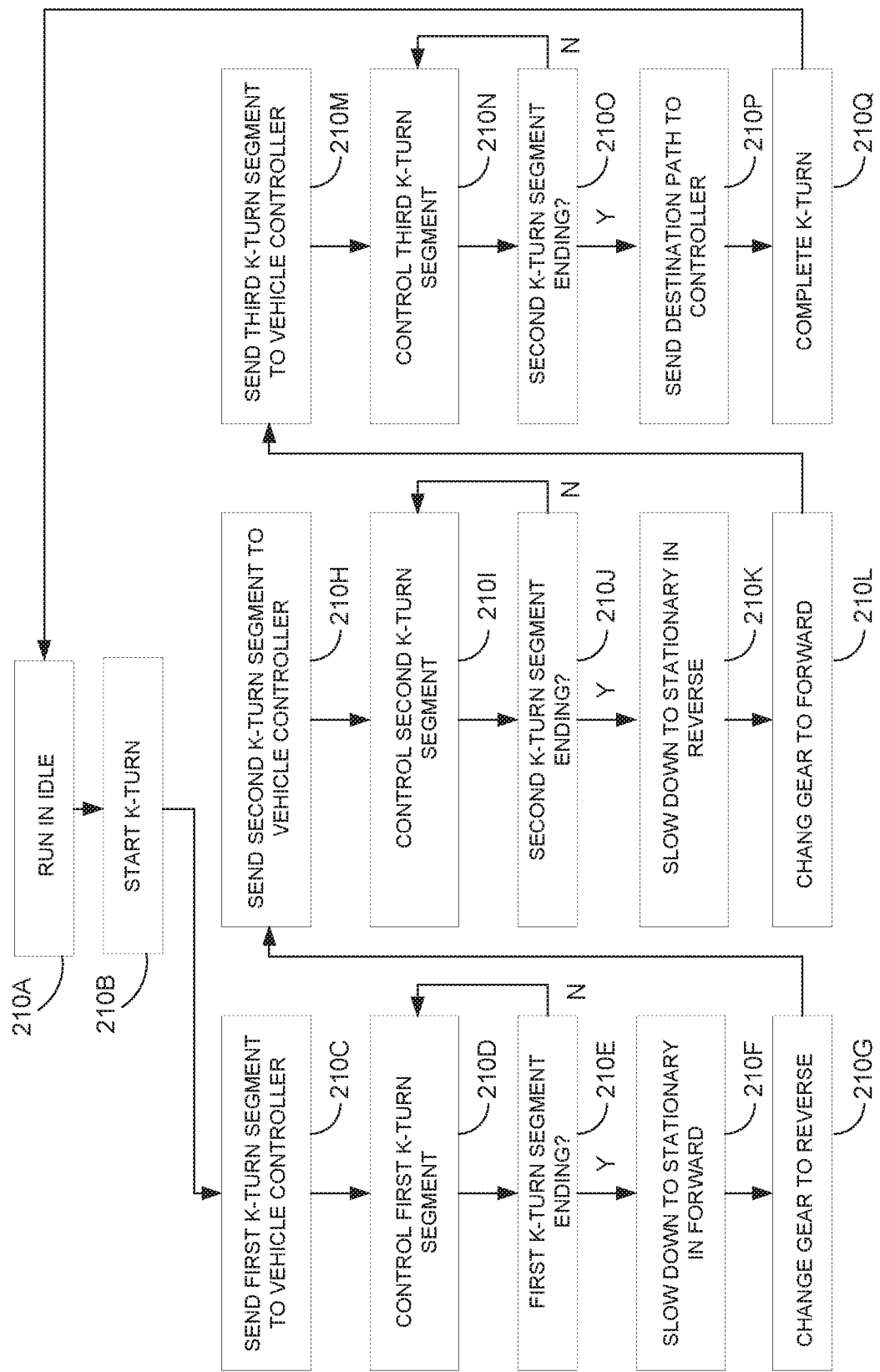
FIG. 6 shows an example process for executing a K-turn with a vehicle.

FIG. 6 shows how the guidance system uses the derived K-turn path to turn the vehicle around onto a next AB way-line. A typical scenario of executing the K-turn may include the vehicle operator creating a boundary or headland region around the perimeter of a field as described above in FIGS. 1 and 2. The vehicle operator may define reference AB way-lines for the field up to the boundary adjacent to the headland region. The operator also may select or enable K-turn operations via a menu option.

The guidance system in operation 210A may run in idle state and wait for a command to start steering the vehicle on a K-Turn path. The guidance system in operation 210B may start the sequence of operations to perform a K-turn to move the vehicle from the end of the current AB way-line to the next AB way-line.

In operation 210C the guidance system sends the first K-turn segment to a vehicle steering controller. The vehicle controller may be any type of electro-mechanical system that steers the vehicle along the first K-turn segment. In one example, the guidance system may send a series of turn and speed commands that the vehicle steering controller uses to steer the vehicle along the first K-turn segment in operation 210D.

Operation 210E monitors the vehicle location and operation 210F slows down the vehicle to a stationary in forward direction when the vehicle reaches the end of the first K-turn segment. Operation 210G then shifts gears in the vehicle from the forward direction to a reverse direction.

The guidance system in operation 210H sends the second K-turn segment to the steering controller. For example, for K-turn 130A in FIG. 3, the guidance system may send steering commands for a straight reverse direction at a specified distance. One example scheme for automatically steering a vehicle in both curved or straight paths in either a forward or reverse direction is described in co-pending U.S. patent application Ser. No. 15/345,792 entitled: SINGLE-MODE IMPLEMENT STEERING, filed Nov. 8, 2016 which is herein incorporated by reference in its entirety.

Operation 210I steers the vehicle along the second K-turn segment and operation 210K slows down the vehicle to a stationary in reverse direction when the vehicle reaches the end of the second K-turn segment. Operation 210L then changes gears of the vehicle from the reverse direction back to the forward direction.

The guidance system in operation 210M sends the third K-turn segment to the vehicle steering controller. For example, for K-turn 130A in FIG. 3, the guidance system may send steering commands for a forward right curve at the specified speed, maximum steering curvature, and steering curvature rate. Operation 210N then steers the vehicle along the third K-turn segment.

Operation 210O detects the vehicle reaching the end of the third segment and operation 210P sends the destination path to the vehicle steering controller. For example, the guidance system may send steering commands for the next AB way-line. When the vehicle completes the K-turn, operation 210Q transitions into steering the vehicle along the next AB way-line.

Computer, Software, and Control Systems

Examples of systems, apparatus, computer-readable storage media, and methods are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described above are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

A Global navigation satellite system (GNSS) is broadly defined to include GPS (U.S.), Galileo (European Union, proposed), GLONASS (Russia), Beidou (China), Compass (China, proposed), IRNSS (India, proposed), QZSS (Japan, proposed) and other current and future positioning technology using signal from satellites, with or without augmentation from terrestrial sources.

Inertial navigation systems (INS) may include gyroscopic (gyro) sensors, accelerometers and similar technologies for providing outputs corresponding to the inertial of moving components in all possible axes (linear directions along and rotational about the X, Y and Z axes respectively). Said terminology will include the words specifically mentioned, derivative thereof and words of similar meaning.

Figure 7:
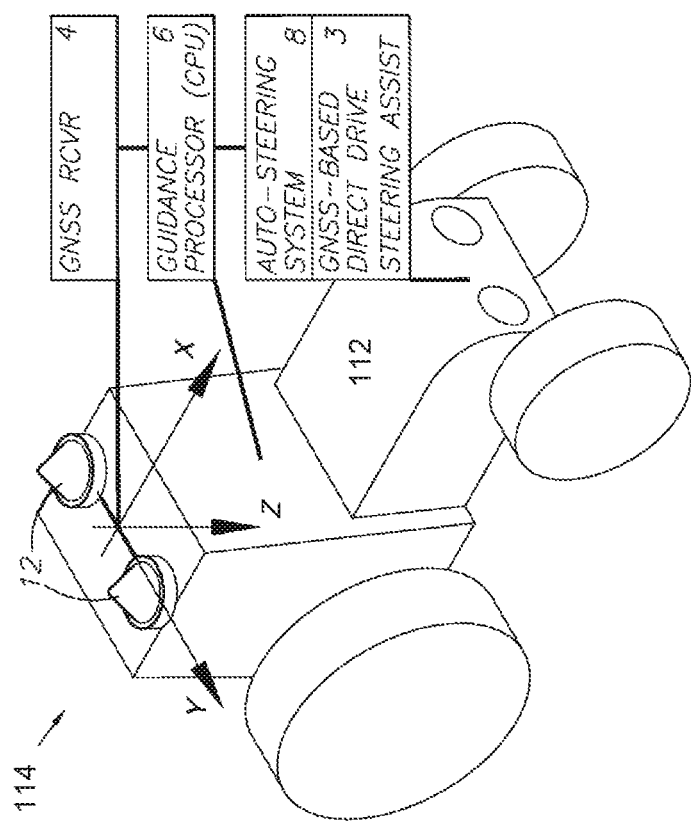
FIG. 7 shows an example guidance system for generating and performing K-turns.

FIG. 7 generally designates guidance system 114 implementing an electrical direct-drive steering assistance mechanism 3. Without limitation on the generality of useful applications of guidance system 114, a GNSS receiver 4 and a guidance processor 6 are connected to a GNSS antenna 12 and installed into vehicle 112, such as an agricultural vehicle or tractor. An auto-steering system 8 is electrically connected to guidance processor 6, and is mechanically interfaced with vehicle 112 via steering assistance mechanism 3.

Figure 8:
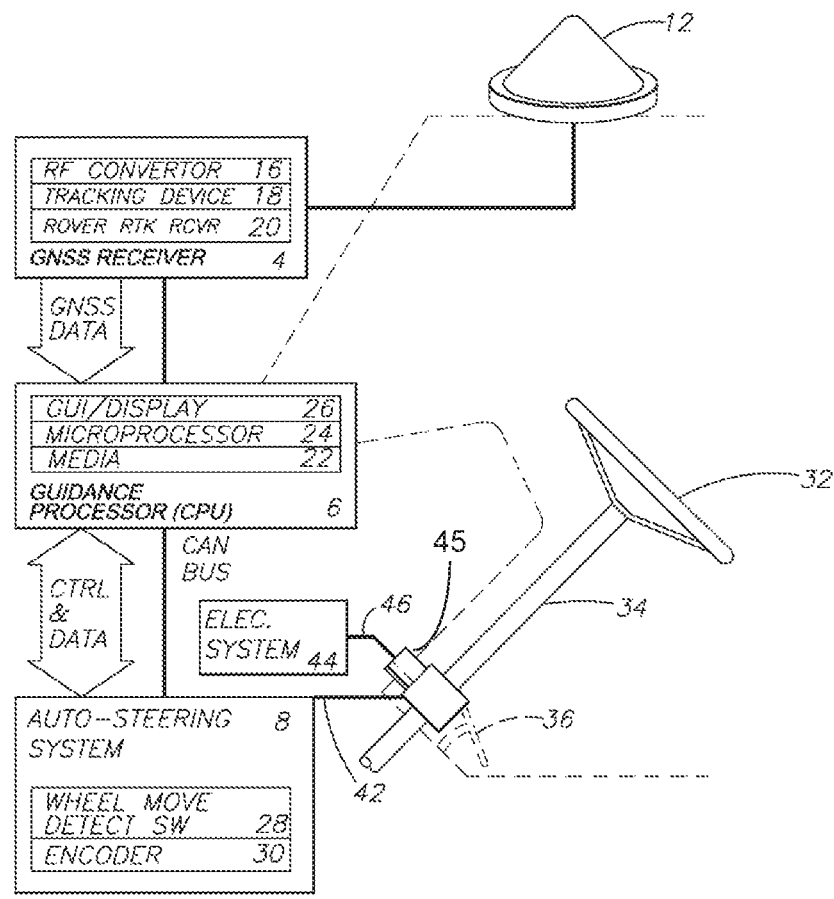
FIG. 8 shows the guidance system controlling an autosteering system.

FIG. 8 shows an additional detail of guidance system 114. The GNSS receiver 4 is further comprised of an RF convertor (i.e., down convertor) 16, a tracking device 18, and a rover RTK receiver element 20. The receiver electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 8. An auto-steering subsystem includes a wheel movement detection switch 28 and an encoder 30 for interpreting guidance and steering commands from CPU 6.

Auto-steering system 8 may interface mechanically with the vehicle's steering column 34, which is mechanically attached to steering wheel 32. A control line 42 may transmit guidance data from the CPU 6 to the auto-steering system 8. An electrical subsystem 44, which powers the electrical needs of vehicle 112, may interface directly with auto-steering system 8 through a power cable 46. Auto-steering subsystem 8 can be mounted to steering column 34 near the floor of the vehicle, and in proximity to the vehicle's control pedals 36. Alternatively, auto-steering system 8 can be mounted at other locations along steering column 34.

The auto-steering system 8 physically drives and steers vehicle 112 by actively turning steering wheel 32 via steering column 34. A motor 45 powered by vehicle electrical subsystem 44 may power a worm drive which powers a worm gear affixed to auto-steering system 8. In other embodiments, auto-steering system 8 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in guidance system 114 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A controller for steering a vehicle, comprising:
    a processor;
    a steering controller coupled to the processor to steer the vehicle;
    one or more sensors coupled to the processor to identify a position of the vehicle; and
    memory coupled to the processor and storing instructions that, when executed by the processor, cause the controller to:
        send commands to the steering controller to steer the vehicle along a first way line on a field;
        detect, based on data from the one or more sensors, the vehicle reaching an end of the first way line;
        pre-calculate a K-turn path for the vehicle prior to accessing a headland area of the field, the K-turn path comprising a first segment, a second segment, and a third segment, wherein pre-calculating the K-turn path includes:
            determining a maximum steering curvature of the vehicle;
            determining a maximum steering curvature rate of the vehicle; and
            calculating one or more of the first segment, the second segment, and the third segment based on the maximum steering curvature of the vehicle and the maximum steering rate of the vehicle;
        send the K-turn path to the steering controller to turn the vehicle around in the headland area of the field to a beginning of a second way line on the field; and
        steer the vehicle along the second way line using the steering controller.

2. The controller of claim 1, wherein sending the K-turn path to the steering controller includes:
    sending the first segment of the K-turn path to the steering controller to steer the vehicle in a forward direction;
    detecting the vehicle reaching an end of the first segment;
    sending the second segment of the K-turn path to the steering controller to steer the vehicle in reverse direction;
    detecting the vehicle reaching an end of the second segment; and
    sending the third segment of the K-turn path to the steering controller to steer the vehicle along to the destination way line.

3. The controller of claim 2, wherein the first and third segments are substantially symmetric.

4. The controller of claim 1, wherein pre-calculating the K-turn path includes:
    pre-calculating a plurality of K-turn paths, the plurality of K-turn paths including a first K-turn path with a first turning direction and a second K-turn path with a second turning direction, the first turning direction being different from the second turning direction; and
    selecting the second K-turn path to send to the steering controller for steering the vehicle based on determining that the first K-turn path extends outside of the headland area and the second K-turn path is within the headland area.

5. The controller of claim 4, wherein selecting the second K-turn path is further based on:
    identifying an obstruction overhanging the headland area; and
    determining that the second K-turn path avoids collision between the vehicle and the overhanging obstruction.

6. The controller of claim 1, wherein the memory further stores instructions for causing the controller to:
    store different K-turn shapes;

identify a location and orientation of the vehicle at the end of the first way-line and a desired location and orientation of the vehicle at the beginning of the second way-line; and select one of the different K-turn shapes for the K-turn path based on the location and orientation of the vehicle at the end of the first way-line and the desired location and orientation of the vehicle at the beginning of the second way-line.

7. The controller of claim 6, wherein the memory further stores instructions for causing the controller to:

identify a shape of the field at the end of the first way-line and the beginning of the second way line; and select one of the different K-turn shapes based on the shape of the field at the end of the first way-line and beginning of the second way-line.

8. The controller of claim 1, further comprising a display screen coupled to the processor, wherein the memory further stores instructions for causing the controller to:

display the field on an electronic map presented on the display screen;

display a boundary on the electronic map surrounding the field;

define the headland area on the electronic map between the boundary and one end of the field; and pre-calculate the K-turn path based on the defined headland area defined on the electronic map.

9. The controller of claim 1, wherein the memory further stores instructions for causing the controller to:

identify a starting position and heading of the vehicle;
identify an ending position and heading of the vehicle;
determine the K-turn segments based on the maximum steering curvature, the maximum steering curvature rate, the starting position and heading of the vehicle, and the ending position and heading of the vehicle; and send the K-turn segments to the steering controller to steer the vehicle from the starting position and heading to the ending position and heading.

10. The controller of claim 9, wherein the memory further stores instructions for causing the controller to:

identify a maximum steering curvature of the vehicle in a left direction;

identify a maximum steering curvature of the vehicle in a right direction;

identify a maximum steering curvature rate of the vehicle in the left direction;

identify a maximum steering curvature rate of the vehicle in the right direction; and determine the K-turn segments based on the maximum steering curvature of the vehicle in the left direction, the maximum steering curvature of the vehicle in the right direction, the maximum steering curvature rate of the vehicle in the left direction, and the maximum steering curvature rate of the vehicle in the right direction.

11. The controller of claim 10, wherein the first and third curvatures and curvature rates are the same.

12. The method controller of claim 9, wherein the memory further stores instructions for causing the controller to:

send the first K-turn segment to the steering controller causing the vehicle to turn with a first curvature and first curvature rate;

send the second K-turn segment to the steering controller causing the vehicle to turn with a second curvature and second curvature rate; and send the third K-turn segment to the steering controller causing the vehicle to turn with a third curvature and third curvature rate.

13. The controller of claim 12, wherein the memory further stores instructions for causing the controller to generate one or more of: the first segment, the second segment, and the third segment with a curvature bounded by the maximum steering curvature of the vehicle and a curvature first derivative bounded by the maximum steering curvature rate of the vehicle.

14. The controller of claim 12, wherein the curvature for the first segment and the second segment is greater than the curvature for the third segment, and wherein the curvature rates for the first segment and the second segment are greater than the curvature rate for the third segment.

15. The controller of claim 9, wherein the memory further stores instructions for causing the controller to:

store different K-turn shapes;

identify an available headland area based on the starting position and heading of the vehicle and the ending position and heading of the vehicle;

select one of the different K-turn shapes based on the available headland area; and send the K-turn segments for the selected K turn shape to the steering controller to steer the vehicle from the starting position to the ending position.

16. The controller of claim 1, wherein the memory further stores instructions for causing the controller to:

steer the vehicle, using the steering controller, through the first segment of the K-turn path;

allow an operator of the vehicle to shift the vehicle into a reverse gear; and steer the vehicle, using the steering controller, through the second segment of the K-turn path and the third segment of the K-turn path.

17. The controller of claim 1, wherein the one or more sensors include one or more of: a global positioning system (GPS) and an inertial navigation device, and wherein the maximum steering curvature of the vehicle and the maximum steering curvature rate of the vehicle are determined based on data from the one or more sensors.

18. A method comprising:

sending, by a vehicle guidance system, commands to a steering controller to steer a vehicle along a first way line on a field;

detecting, by the vehicle guidance system based on data from one or more sensors, the vehicle reaching an end of the first way line;

pre-calculating, by the guidance system, a K-turn path for the vehicle prior to accessing a headland area of the field, the K-turn path comprising a first segment, a second segment, and a third segment, wherein pre-calculating the K-turn path includes:

determining a maximum steering curvature of the vehicle;

determining a maximum steering curvature rate of the vehicle; and calculating one or more of the first segment, the second segment, and the third segment based on the maximum steering curvature of the vehicle and the maximum steering rate of the vehicle;

sending, by the guidance system, the K-turn path to the steering controller to turn the vehicle around in the headland area of the field to a beginning of a second way line on the field; and steering, by the guidance system, the vehicle along the second way line using the steering controller.

19. A non-transitory computer-readable medium storing instructions that, when executed by a vehicle guidance system, cause the vehicle guidance system to perform operations comprising:
- sending commands to a steering controller to steer a vehicle along a first way line on a field;
- detecting, based on data from one or more sensors, the vehicle reaching an end of the first way line;
- pre-calculating a K-turn path for the vehicle prior to accessing a headland area of the field, the K-turn path comprising a first segment, a second segment, and a third segment, wherein pre-calculating the K-turn path includes:
  - determining a maximum steering curvature of the vehicle;
  - determining a maximum steering curvature rate of the vehicle; and
  - calculating one or more of the first segment, the second segment, and the third segment based on the maximum steering curvature of the vehicle and the maximum steering rate of the vehicle;
- sending the K-turn path to the steering controller to turn the vehicle around in the headland area of the field to a beginning of a second way line on the field; and
- steering the vehicle along the second way line using the steering controller.

\* \* \* \* \*